US006862108B2

(12) United States Patent
Kito

(10) Patent No.: US 6,862,108 B2
(45) Date of Patent: Mar. 1, 2005

(54) OPTICAL PRINTER WITH MICROMIRROR DEVICE

(75) Inventor: Eiichi Kito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 924 days.

(21) Appl. No.: 09/791,865

(22) Filed: Feb. 26, 2001

(65) Prior Publication Data

US 2001/0017702 A1 Aug. 30, 2001

(30) Foreign Application Priority Data

Feb. 25, 2000 (JP) ........................................ 2000-048615

(51) Int. Cl.[7] ............................ G06F 15/00; G06F 1/00; G06F 15/02
(52) U.S. Cl. ........................ 358/1.2; 358/1.9; 358/3.12; 347/137; 347/231; 347/255
(58) Field of Search ........................ 358/1.2, 1.9, 3.12; 347/241, 239, 137, 231, 255; 359/224, 292

(56) References Cited

U.S. PATENT DOCUMENTS 5,461,411 A * 10/1995 Florence et al. ............ 347/240
5,703,671 A * 12/1997 Narita et al. ................. 355/32
5,933,183 A * 8/1999 Enomoto et al. ............ 347/241
2001/0004265 A1 * 6/2001 Kurematsu .................. 347/234

FOREIGN PATENT DOCUMENTS

| JP | 9-164727 | 6/1997 | ............ B41J/2/525 |
| JP | 9-314910 | 12/1997 | ............ B41J/2/525 |

* cited by examiner

Primary Examiner—Edward Coles
Assistant Examiner—David L Jones
(74) Attorney, Agent, or Firm—Sughrue Mion, PLLC

(57) ABSTRACT

An optical printer has a DMD as a spatial light modulator. An optical image corresponding to a picture frame is projected from the DMD onto a photographic paper in a variable size to print the picture frame in a designated print size. When a maximum print size is designated, image data stored in three color image memories is entirely converted into mirror drive data for driving all micromirrors of the DMD in accordance with the image data. When a smaller print size is designated, the image data is thinned to reduce the image data size in correspondence with the smaller print size. Also a smaller area of the DMD is selected as an active area in which micromirrors are driven in accordance with the thinned image data, to print a picture in the smaller print size.

7 Claims, 7 Drawing Sheets

OPTICAL PRINTER WITH MICROMIRROR DEVICE

BACKGROUND OF THE INVENTION

1. Field of the Invention

The present invention relates to an optical printer with a spatial light modulator constituted of a micromirror device having a large number of very small mirrors with variable reflecting direction.

2. Background Arts

Optical printers print pictures, including characters and drawings, on photosensitive materials, such as photographic paper. Of the optical printers, color photographic printers that project an optical image of a picture frame from negative photographic film onto photographic paper have been widely used. Recently, digital optical printers have been developed and used in practice that drive a display device in accordance with digital image data to print a picture by projecting printing light beams or an optical image from the display device onto a photosensitive material. As the digital optical printers, there are CRT type, Laser type, LCD type, micromirror type and so forth.

The micromirror type optical printer uses a spatial light modulator constituted of an array of a large number of very small mirrors, called a micromirror array. The micromirror array is arranged in a row or in a matrix, i.e. in a plurality of rows. The micromirrors may tilt each individually to reflect a spot light beam in a variable direction. Exemplars of the micromirror type optical printers are disclosed in Japanese Laid-open Patent Application Nos. 9-164727 and 9-314910. Since the micromirror type optical printer utilizes reflection of mirrors, the attenuation of light is smaller than other types, so the printing light is most efficiently utilized. Of the micromirror type spatial light modulator, there are digital micromirror devices (DMD) and piezo-drive type micromirror device (AMD). The DMD uses electrostatic power to tilt the micromirrors, whereas the AMD uses very small piezoelectric elements to tilt the micromirrors. In the optical printers, each micromirror of the DMD and AMD corresponds to one pixel.

To permit changing the print size, a zoom lens has usually been used as a projection lens, and its magnification is changed according to the print size. For changing the lens magnification of the zoom lens, a mechanical lens driving device, such as a motor, is needed. The mechanical device takes a certain time to change the print size. This is disadvantageous for printing pictures successively in different sizes at a high speed.

SUMMARY OF THE INVENTION

In view of the foregoing, an object of the present invention is to provide an optical printer that is simple in structure and makes it possible to change the print size very quickly.

To achieve the above object, in an optical printer that comprises a spatial light modulator having an array of micromirrors arranged in a row or in a matrix, the micromirrors being able to tilt each individually between an effective reflecting position and an ineffective reflecting position; a light source section illuminating the micromirror array; an image projecting optical system for projecting printing light beams from those ones of the micromirrors which are in the effective reflecting position, as an optical image onto a photosensitive material; and a paper advancing device for advancing the photosensitive material, the present invention suggests providing an active area determining device for determining an active area of the micromirror array of the spatial light modulator in accordance with a selected print size; and a driving device for driving each of those micromirrors included in the active area to tilt either to the effective reflecting position or to the ineffective reflecting position in accordance with image data, thereby to project the optical image on the photosensitive material in a size according to the selected print size.

Changing the size of the active area of the micromirror array in accordance with the print size makes it unnecessary to change the magnification of the projection lens. Thus, any mechanical driving device for changing the image magnification is not needed, so a high speed printing is achieved with variable print size.

According to a preferred embodiment, a light collecting device is provided for collecting light beams reflected from those micromirrors excluded from the active area of the micromirror array and conducting the collected light beams back to the light source section, to reuse them for illuminating the micromirror array. Thereby, light efficiency is improved.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
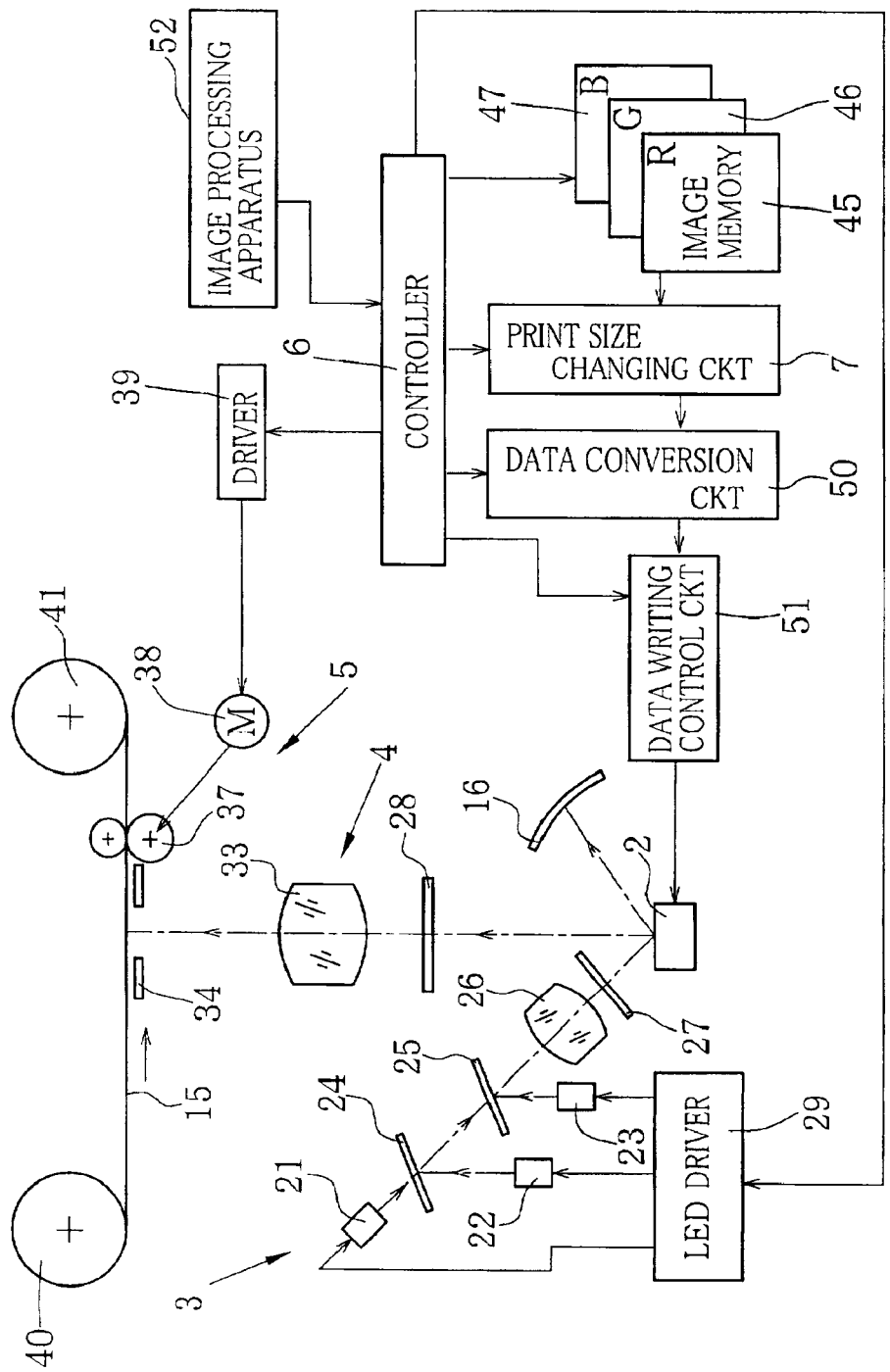
FIG. 1 is a schematic diagram illustrating an optical printer according to an embodiment of the present invention.

In FIG. 1, an optical printer according to an embodiment of the present invention has a digital micromirror device (DMD) 2 as a spatial light modulator, a light source section 3 for illuminating the DMD 2, an image projecting optical system 4, a paper advancing section 5, a controller 6, and a print size changing section 7.

Figure 2:
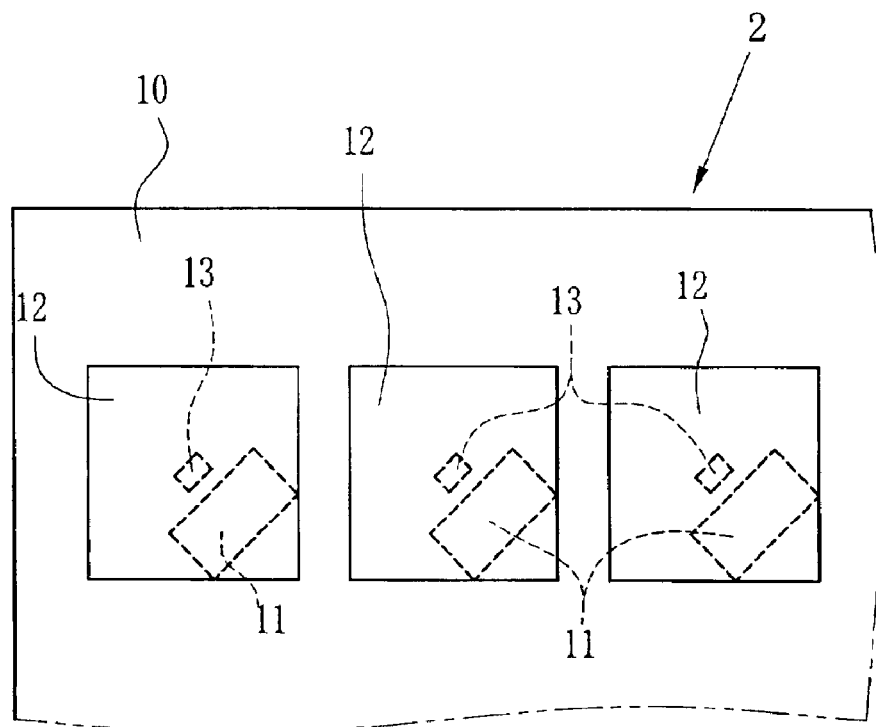
FIG. 2 is an enlarged fragmentary top plan view illustrating a digital micromirror device used as a spatial light modulator.

As shown in FIG. 2, the DMD 2 has a large number of memory cells 11 formed on a statistic RAM (SRAM) 10.

Figure 3:
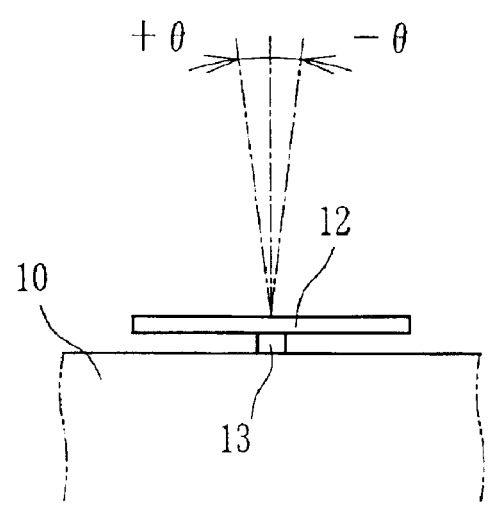
FIG. 3 is a side view of one segment of the digital micromirror device, illustrating the operation of the digital micromirror device.

Above each of the memory cells 11 is disposed a micromirror 12, a very small square mirror chip, e.g. 16 μm on a side, made of conductive metal foil, e.g. aluminum foil. As shown in FIG. 3, the micromirror 12 is supported at its center on a post 13 so as to be able to tilt about the post 13. The micromirror 12 is tilted by an electrostatic force generated between the memory cell 11 and the micromirror 12. The memory cell 11, the micromirror 12 and the post 13 are formed according to a well-known integration technique.

While the micromirror 12 is not supplied with electric power, the micromirror 12 is held horizontal to a top surface of the SRAM 10. The micromirror 12 is tilted from this horizontal initial position in response to mirror drive data being written on the corresponding memory cell 11. Each memory cell 11 may store 1-bit, so the mirror drive data is 1-bit data. The micromirror 12 tilts by an angle +θ when the written mirror drive data is "1", or by an angle −θ when the written mirror drive data is "0". Accordingly, the micromirror 12 may rock through an angular range of 2θ.

According to the present embodiment, when the micromirror 12 tilts by +θ, it directs light from the light source section 3 toward the photographic paper 15 as placed in a printing station behind a paper mask 36. Thus, the position tilted by +θ may be called an effective reflecting position, and spot light beams reflected from those micromirrors being in the effective reflecting position and directed toward the photographic paper 15 may be called printing light beams. In the initial horizontal position and the other tilted position, the light reflected from the micromirror 12 is not directed to the photographic paper 15. While the micromirror 12 tilts by −θ, the reflected light is directed to a light absorbing plate 16, so this position may be called ineffective reflecting position.

The light source section 3 consists of a red LED device 21, a green LED device 22, a blue LED device 23, first and second dichroic mirrors 24 and 25, a convergent lens 26, and a balance filter 27. The red LED device 21 is constituted of a large number of red LEDs arranged in a matrix on a substrate to emit red rays from an area. The green LED device 22 and the blue LED device 23 are respectively constituted of green LEDs and blue LEDs in the same way as the red LED device 21. These LED devices 21 to 23 are driven one after another by an LED driver 29 under the control of the controller 6, for photographing a full-color image on the color photographic paper 15 in a three-color frame sequential fashion. The LED driver 29 controls light intensity of each of the LED devices 21 to 23 to adjust exposure amounts and color balance to characteristics of the color photographic paper 15 that vary depending upon the paper types. Because the LEDs are superior in responding properties, the LED devices begin to emit rays at a desired intensity in a short time.

The first dichroic mirror 24 allows the red rays from the red LED device 21 to pass through it, and reflects green rays from the green LED device 22. The second dichroic mirror 25 allows the red rays and the green rays to pass through it, but reflects blue rays from the blue LED device 23. The convergent lens 26 converges the rays from the individual LED devices 21 to 23 to illuminate the entire area of the DMD 2.

The micromirrors 12 of the DMD 2 are arranged in a matrix that corresponds in pixel number as well as in aspect ratio to a maximum available print size of one picture frame.

The image projecting optical system 4 is constituted of a balance filter 28 and a projection lens 33 having a fixed magnification of projection. The balance filters 27 and 28 are for correcting shading of the rays traveling through the filters, to reduce unevenness in the light amount.

The projection lens 33 forms an optical image from the printing light beams that are reflected from those micromirrors 12 which are in the effective reflecting position, and projects the optical image onto a photosensitive surface of the color photographic paper 15 in an area framed by a paper mask 34, while the color photographic paper 15 stops behind the paper mask 34. The aperture size of the paper mask 34 is controllable by the controller 6 in accordance with a designated print size of a picture to print. Accordingly, the area framed by the paper mask 34 has a size equal to the designated print size.

The paper advancing section 5 is provided with a pair of paper feed rollers 37 and a paper feed motor 38 for rotating the paper feed rollers 37. The paper feed motor 38 is driven by a driver 39 under the control of the controller 6, such that the color photographic paper 15 is advanced stepwise from a paper supply roll 40. While the color photographic paper 15 stops, a full-color picture is printed on the area placed behind the paper mask 34 in a three color frame sequential fashion. Thereafter the color photographic paper 15 is advanced by a length corresponding to the designated print size.

To the controller 6 are connected three color image data memories 45, 46 and 47, the print size changing section 7, a data conversion circuit 50, a data writing control circuit 51, and an external image processing apparatus 52. The image processing apparatus 52 sends the controller 6 image data of a picture to print and print size data representative of a print size, after processing the image data to control gray balance, gradation, density and saturation of the image. The controller 6 writes the entered image data for each color in the image data memories 45 to 47, and reads out the image data sequentially from the image data memories 45 to 47 in synchronism with driving intervals of the three color LED devices 21 to 23. For instance, while the red LED device 21 is being driven, the image data for red is read out from the red image memory 45.

The print size changing section 7 changes the size of the image data in correspondence with the print size designated by the print size data. In the present embodiment, since the pixel number of the image data stored in each image memory 45, 46 or 47 is equal to the number of the micromirrors 12 of the DMD 2, if the maximum print size is designated, the print size changing section 7 sends the entire image data from the image memories 45 to 47 to the data conversion circuit 50. If a smaller print size is designated, the print size changing section 7 compresses the image data by thinning in accordance with the designated print size. Where the pixel number of each of three color image memories is not equal to the number of the micromirrors of the DMD, the image data is thinned or interpolated to change the data size in correspondence with the designated print size even when a maximum print size, which is predetermined by the size of the DMD, is designated.

Figure 4:
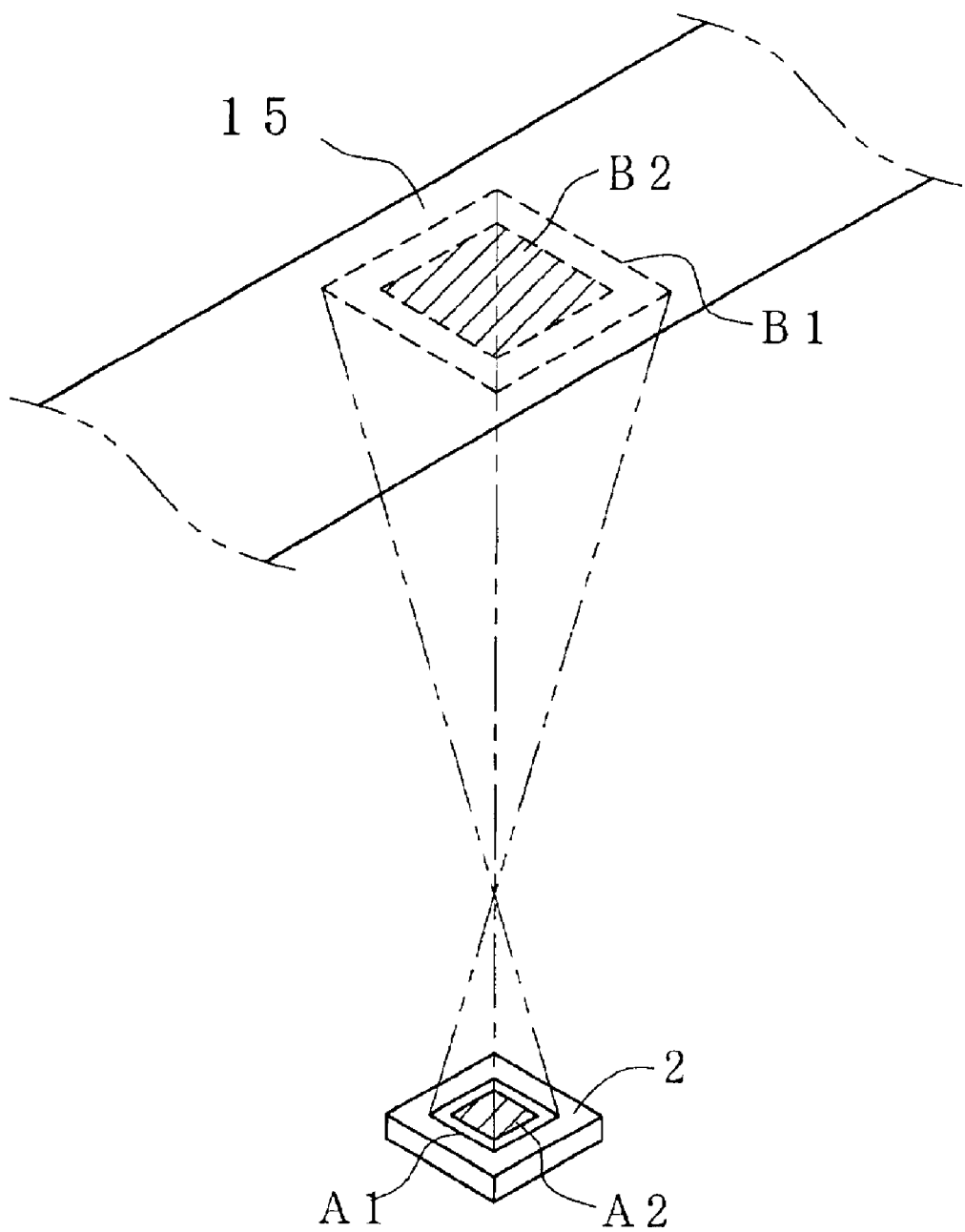
FIG. 4 is an explanatory diagram illustrating a relationship between a driven area of the digital micromirror device and an image projection area on a photographic paper.

As shown for example in FIG. 4, if the maximum print size is designated, an area A1 including all the micromirrors 12 of the DMD 2 is selected as an active area, and an optical image is projected onto the photographic paper 15 in the maximum print size as shown by dashed lines B1. If a smaller print size is designated, a smaller area A2 of the DMD 2 is selected as an active area, and those micromirrors 12 included in the smaller active area A2 are driven in accordance with the compressed image data. As a result, an optical image is projected on the photographic paper 15 in the smaller size as shown by a hatched area B2, without the need for changing the magnification of the projection lens 33. The aperture size of the paper mask 34 is also adjusted to the designated print size.

The data conversion circuit 50 picks up the image data of each pixel one bit after another in the order from the most significant digit, and sends each bit of the image data as the mirror drive data to the data writing control circuit 51. The data writing control circuit 51 writes the mirror drive data on each of the memory cells 11 of the SRAM 10 at intervals determined by a writing timing signal that is supplied from the controller 6. The mirror drive data is written on the memory cell 11 a constant number of times per one pixel, the constant number being determined by the bit number of the image data for one pixel.

Figure 5:
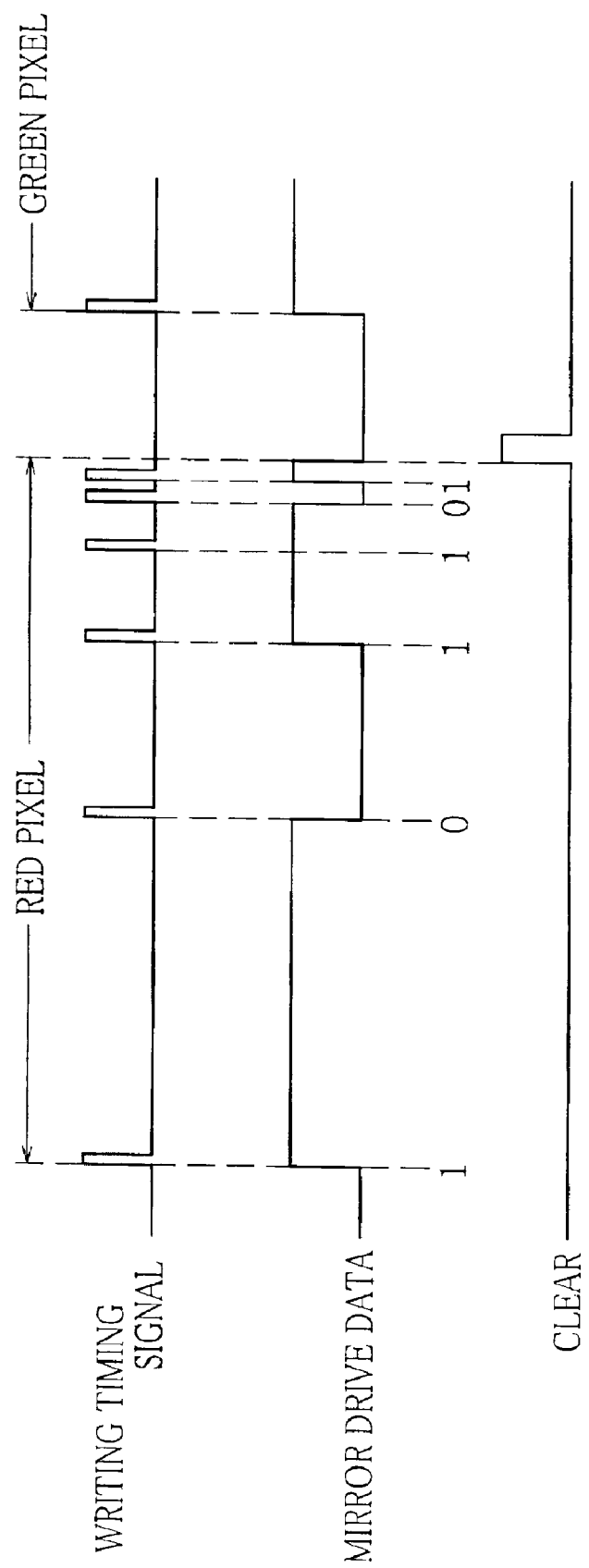
FIG. 5 shows timing charts of examples of signals used for printing a red pixel.

According to the embodiment shown in FIG. 5, the writing timing signal is generated at intervals decreasing half the preceding interval within a printing cycle for one pixel. That is, the image data of each pixel is subjected to a pulse duration modulation when each bit of the image data is seriatim written as the mirror drive data on the memory cell 11. In results, the color photographic paper 15 is exposed to the printing light by a different amount for each pixel in correspondence with the image data of the individual pixel. It is to be noted that the image data may be converted into the mirror drive data in a different way from the above embodiment, for example, in a way as disclosed in the above mentioned Japanese Laid-open Patent Application No. 9-164727.

Figure 6:
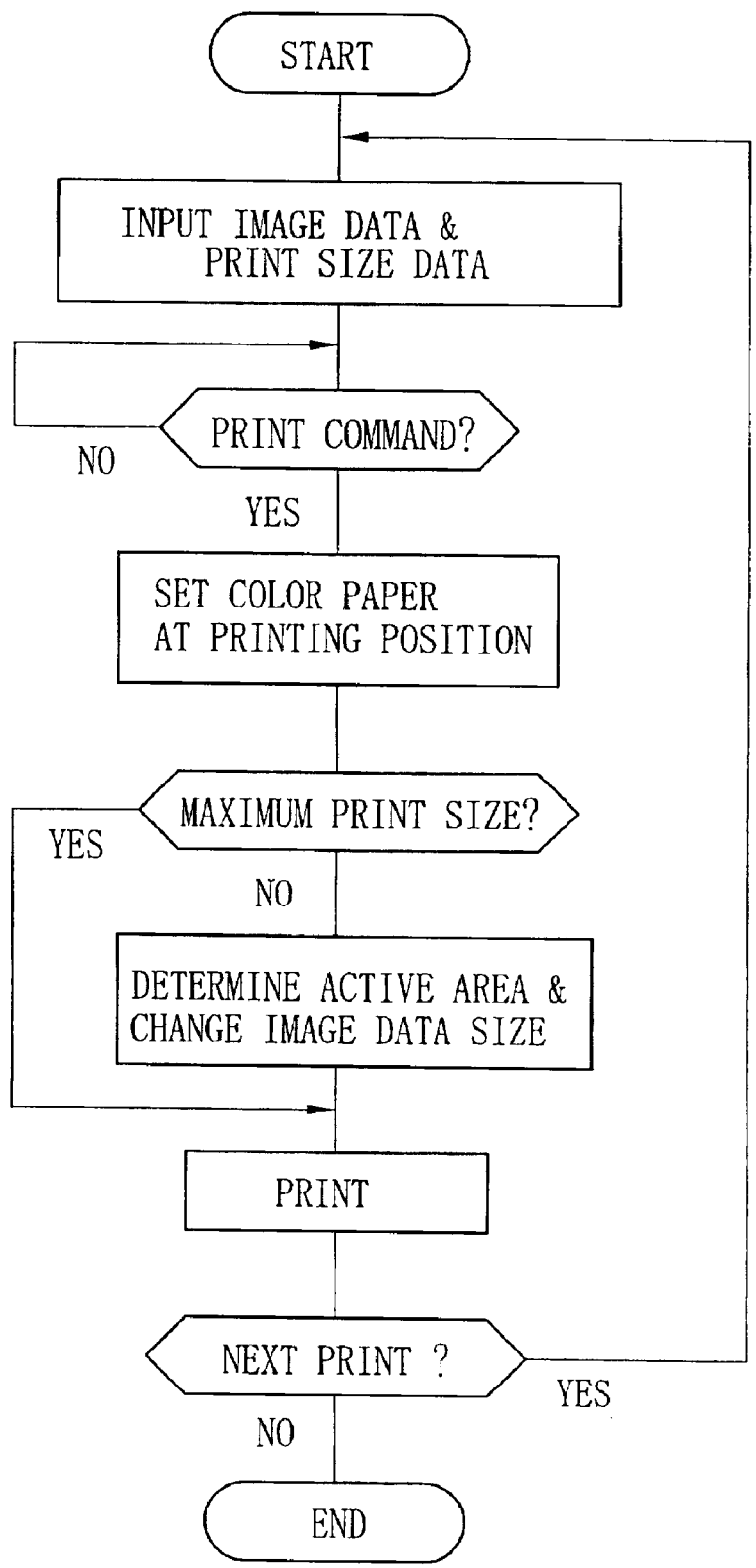
FIG. 6 is a flowchart illustrating an overall operation of the optical printer of FIG. 1.

Now the operation of the above described embodiment will be described with reference to the flow chart of FIG. 6.

First, image data and print size data is entered from the image processing apparatus 52. Next, upon a print command being entered, the controller 6 drives the paper feed motor 38 to place the color photographic paper 15 in the printing station. Simultaneously, the print size changing section 7 determines the active area of the DMD 2 in accordance with the print size data, and changes the size of the image data after reading it out sequentially from the image memories 45 to 47. First the red image data of one frame is read out from the red image memory 45, and is thinned to have a pixel number that is equal to the number of micromirrors 12 included in the determined active area of the DMD 2. If the maximum print size is designated, the red image data of one frame is entirely sent to the data conversion circuit 50, without being thinned.

The data conversion circuit 50 converts the image data of each individual pixels into mirror drive data, and the data writing control circuit 51 writes the mirror drive data on each of the memory cells 11 of the SRAM 10 that are allocated to the micromirrors 12 of the selected active area. Thereby, the micromirrors 12 are each individually switched between the effective reflecting position and the ineffective reflecting position in accordance with the binary value of the mirror drive data written on the corresponding memory cell 11. While the DMD 2 is being driven in accordance with the red image data, the red LED device 21 is driven through the LED driver 29, to illuminate the entire area of the DMD 2 with the red rays.

The printing light beams reflected from those micromirrors 12 placed in the effective reflecting position are focused through the projection lens 33 onto the photosensitive surface of the color photographic paper 15. The micromirrors 12 are set to the effective reflecting position for different total time lengths within the printing cycle of one pixel in correspondence with allocated tonal levels. As a result, red pixels of different tonal levels are printed on the color photographic paper 15 in the designated print size.

After a frame of red pixels of a full-color image are printed in the designated size, the data writing control circuit 51 writes binary "0" on every memory cell 11 of the SRAM 10 in response to a clear signal from the controller 6. Thereafter, green pixels of the same full-color image are printed in the same way as described with respect to the red pixels. And then, the blue pixels are printed in the same way as for the red pixels. When printing of the full-color picture is finished, the paper advancing section 5 is driven to advance the color photographic paper 15 by a length corresponding to the designated print size.

In this way, an active area of the DMD 2 is determined by the designated print size, and the micromirrors 12 included in the active area are driven in accordance with the image data whose size, i.e. pixel number of one frame, is adjusted to the designated print size by the print size changing section 7.

Figure 7:
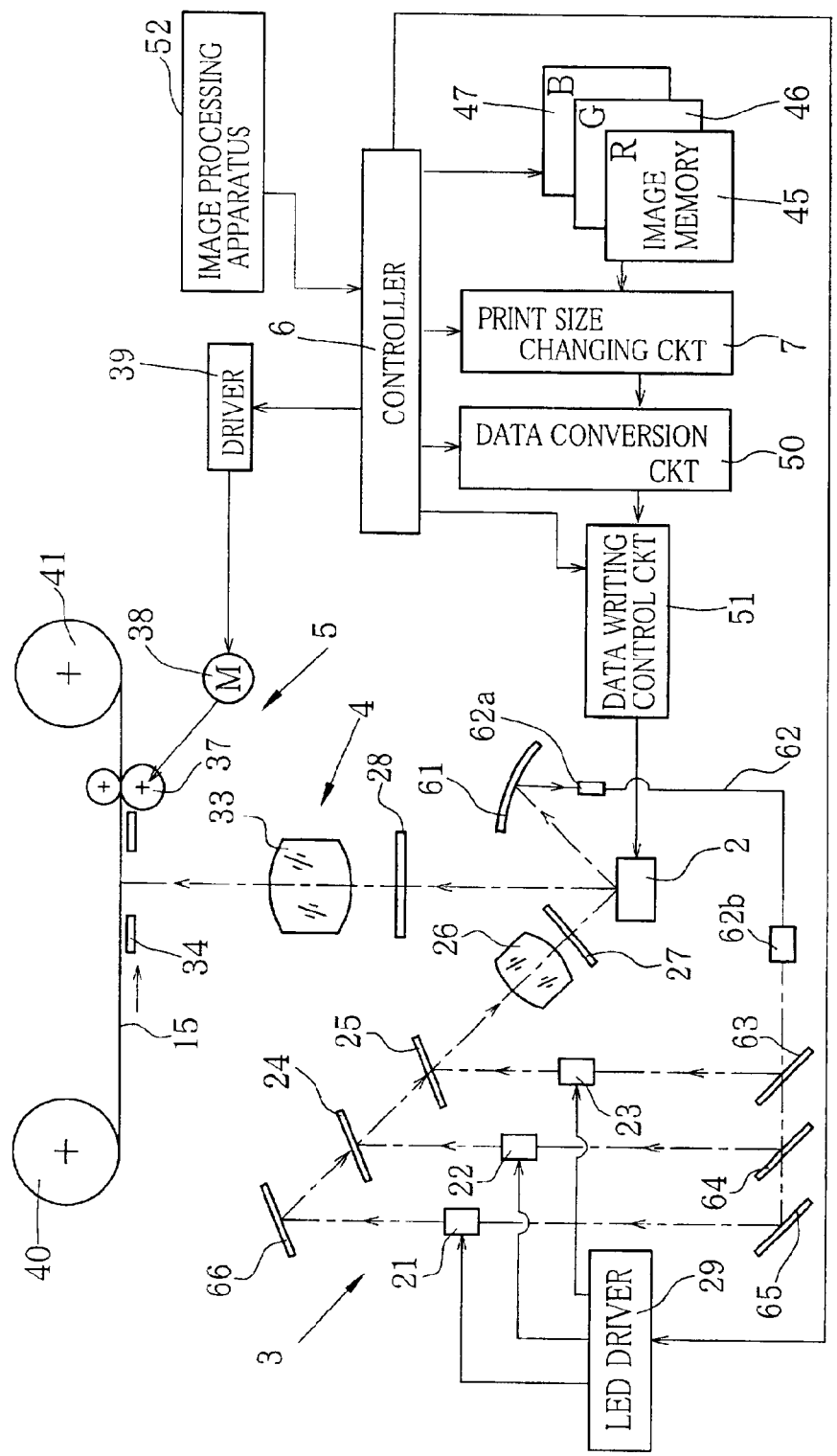
FIG. 7 is a schematic diagram illustrating essential parts of an optical printer according to a second embodiment of the present invention.

Although unnecessary light beams reflected from those micromirrors 12 placed in the ineffective reflecting position are absorbed into the light absorbing plate 16 in the above embodiment, the unnecessary reflected light beams may be fed back for reuse as illumination light beams for the DMD 2. In that case, a reflection plate 61 is substituted for the light absorbing plate 16, as shown in FIG. 7.

The reflection plate 61 has a three-dimensional curved surface to converge the reflected light beams onto a light collecting terminal 62a of an optical fiber cable 62. The light beams collected by the light collecting terminal 62a is conducted through the optical fiber cable 62 and emits from a light emitting terminal 62b of the cable 62. Dichroic mirrors 63, 64 and 65 are placed on the optical path of the light beams from the light emitting terminal 62b. The dichroic mirror 63 reflects only blue light components and lets other light components pass through it. The dichroic mirror 64 reflects only green light components and lets other light components pass through it. The dichroic mirror 65 reflects only red light components and lets other light components pass through it.

The blue light reflected from the dichroic mirror 63 is directed to a dichroic mirror 25 that reflects only blue light components toward a convergent lens 26. The green light reflected from the dichroic mirror 64 is directed to a dichroic mirror 24 that reflects only green light components toward the convergent lens 26. The red light reflected from the dichroic mirror 65 is directed to a mirror 66 that reflects the red light toward the convergent lens 26. Thus, the unnecessary light beams of each color reflected from the DMD 2 toward the reflection plate 61 are reused for illuminating the DMD 2 in addition to light beams of the same color that are emitted from one of three color LED devices 21 to 23.

To reuse only those light beams reflected from an inactive area outside the active area of the DMD 2, it is preferable to provide the reflection plate 61 with a light absorbing section and a reflective section in correspondence with the active area and the inactive area respectively. Since the size of the active area varies depending upon the designated print size, it is preferable to provide a number of reflective sections of different sizes in correspondence with available print sizes, and choose one of the reflective sections according to the designated print size.

Figure 8:
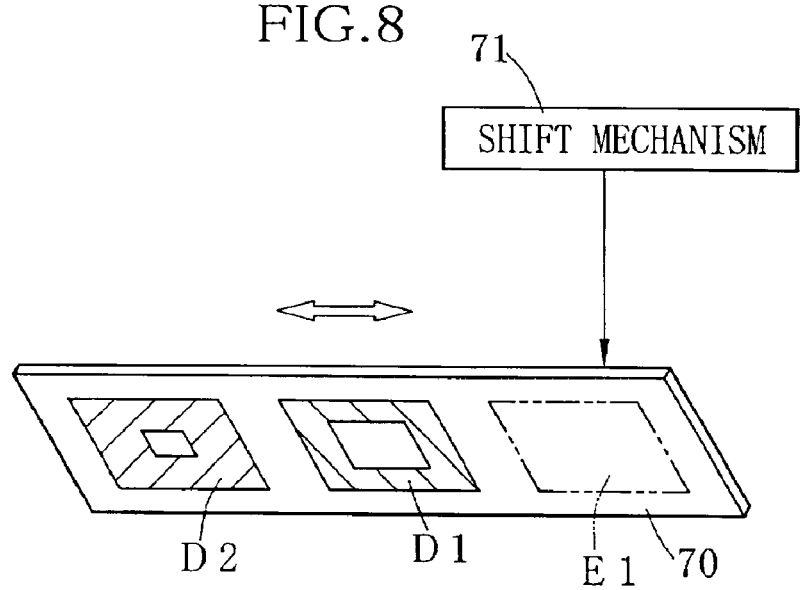
FIG. 8 is an explanatory diagram illustrating an embodiment of a reflection plate for use in the optical printer of the second embodiment.

For example, as shown in FIG. 8, a reflection plate 70 is provided with a first reflective section D1 and a second reflective section D2. A center area of each of the reflective sections D1 and D2 is formed as a light absorbing section.

The light absorbing section inside the first reflective section D1 corresponds to an active area of the DMD 2 selected for a standard print size, whereas the light absorbing section inside the second reflective section D2 corresponds to an active area for a minimum print size. There is also a light absorbing section E1 whose size corresponds to the entire area of the DMD 2.

The reflection plate 70 may be movable by a shift mechanism 71 to place one of the first and second reflective section D1 and D2 or the absorbing section E1 in a light path of the unnecessary light beams from the DMD 2. For example, when the standard print size is designated, the first reflective section D1 is placed in the optical path of the unnecessary light beams. When the maximum print size is designated, the light absorbing section E1 is placed in the optical path of the unnecessary light beams, because the entire area of the DMD 2 is determined to be active in this case.

Although these sections D1, D2 and E1 are arranged side by side on the reflection plate 70, and the reflection plate 70 is shifted sideways, it is possible to arrange different reflective sections or absorbing sections around a center of a round reflection plate, and turn the reflection plate about the center to place one of these sections in the light path of the unnecessary light beams from the DMD 2.

To make a shading correction of the projection lens 33, the time of setting each micromirror 12 in the effective reflecting position for the sake of shading correction (setting time for correction) is previously obtained for each individual pixels, and is used for correcting the setting time in the effective reflecting position as determined based on the image data.

Although the print size is changed without changing the paper size in the above embodiment, it is possible to change the print size in accordance with the size or width of the loaded photographic paper. In that case, it is preferable to provide a paper size detection device or a paper size input device, so that an active area of the DMD may be determined by the paper size.

The present invention is applicable to those optical printers where the micromirrors are arranged in a row, and a picture is printed line by line. In that case, a limited number of micromirrors are driven in accordance with image data of one line when a smaller print size is designated.

Although the image data read out from the image data memory is thinned to adjust the data size to the selected print size in the above embodiment, it is possible to write image data of a smaller frame size, i.e. a smaller pixel number, than the capacity of the image data memory, and use it for driving the micromirrors of a smaller active area to print a picture in a smaller size.

In the above embodiment, the magnification of the projection lens 33 is fixed. It is alternatively possible to use a zoom lens in the image projecting optical system, and change the print size by changing the image magnification and the active area size in combination, thereby to widen the variety of selectable print sizes. It is also possible to vary the light emission area of each LED device according to the designated print size.

When printing a small size picture, it is possible to drive each LED device only partly in accordance with the print size, in addition to change the active area of the DMD 2.

Thus, the present invention is not limited to the illustrated embodiments but, on the contrary, various modifications will be possible to those skilled in the art without departing from the scope of claims appended hereto.

What is claimed is:

1. An optical printer comprising:
   a spatial light modulator having an array of micromirrors arranged in a row or in a matrix, said micromirrors being able to tilt each individually between an effective reflecting position and an ineffective reflecting position;
   a light source section illuminating said micromirror array;
   an image projecting optical system for projecting printing light beams from those ones of said micromirrors which are in said effective reflecting position, as an optical image onto a photosensitive material;
   a paper advancing device for advancing said photosensitive material;
   an active area determining device for determining an active area of said micromirror array of said spatial light modulator in accordance with a selected print size; and
   a driving device for driving each of those micromirrors included in said active area to tilt either to said effective reflecting position or to said ineffective reflecting position in accordance with image data, thereby to project said optical image on said photosensitive material in a size according to said selected print size.

2. An optical printer as recited in claim 1, wherein said image projecting optical system has a fixed magnification.

3. An optical printer as recited in claim 1, further comprising an image data memory for storing image data of one frame which corresponds in pixel number to a maximum print size, and a data size changing device for changing data size of said image data in accordance with said selected print size, wherein when said maximum print size is selected, all of said micromirrors are driven in accordance with said image data stored in said image data memory, and when a smaller print size than said maximum print size is selected, said data size changing device thins said stored image data in correspondence with the number of micromirrors included in an active area corresponding to said smaller print size.

4. An optical printer as recited in claim 2, further comprising an image data memory for storing image data of one frame which corresponds in pixel number to a maximum print size, and a data size changing device for changing data size of said image data in accordance with said selected print size, wherein when said maximum print size is selected, all of said micromirrors are driven in accordance with said image data stored in said image data memory, and when a smaller print size than said maximum print size is selected, said data size changing device thins said stored image data in correspondence with the number of micromirrors included in an active area corresponding to said smaller print size.

5. An optical printer as recited in claim 1, 2 or 3, wherein said light source section illuminates an entire area of said micromirror array regardless of said active area; and said optical printer further comprises a light collecting device for collecting light beams reflected from those micromirrors excluded from said active area and conducting said light beams back to said light source section, to reuse said light beams for illuminating said micromirror array.

6. An optical printer as recited in claim 1, 2 or 3, wherein said light collecting device comprises a light conducting member and a reflection plate for reflecting said light beams from those micromirrors excluded from said active area toward a light collecting terminal of said light conducting member, a light emitting terminal of said light conducting member being located in said light source section.

7. An optical printer as recited in claim 1, 2 or 3, wherein said reflection plate has a plurality of reflective sections and light absorbing sections whose sizes are predetermined in accordance with the sizes of selectable active areas, said reflection plate being shifted to insert said reflective sections or said light absorbing sections selectively in a light path from said spatial light modulator in accordance with selected one of said active areas.

* * * * *